Dec. 4, 1934.   V. J. CHAPMAN   1,983,343
WELDING APPARATUS
Filed Sept. 19, 1933   2 Sheets-Sheet 1

Inventor:
Verni J. Chapman,
by Harry E. Dunham
His Attorney.

Dec. 4, 1934.   V. J. CHAPMAN   1,983,343
WELDING APPARATUS
Filed Sept. 19, 1933   2 Sheets-Sheet 2
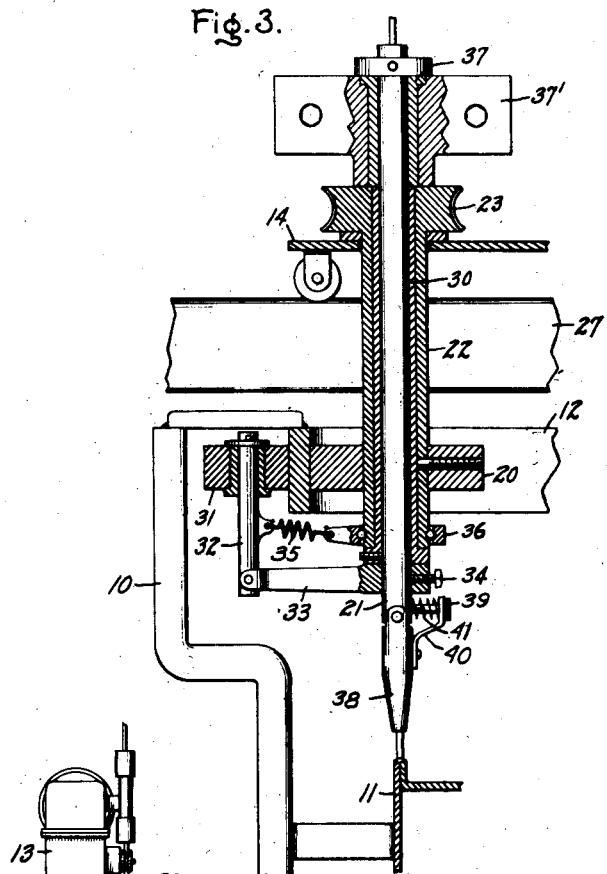
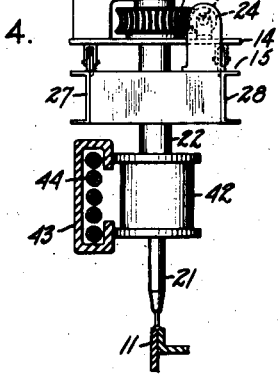
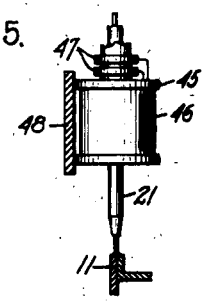
Inventor:
Verni J. Chapman,
by Harry E. Dunlam
His Attorney.

Patented Dec. 4, 1934

1,983,343

UNITED STATES PATENT OFFICE 1,983,343

WELDING APPARATUS

Verni J. Chapman, Schenectady, N. Y., assignor to General Electric Company, a corporation of New York Application September 19, 1933, Serial No. 690,059

14 Claims. (Cl. 219—8)

My invention relates to welding apparatus.

It is an object of my invention to provide a machine of simple and improved construction by means of which seams of predetermined irregular shape may be automatically welded.

It is a further object of my invention to provide in such a machine a guiding means of improved construction.

Figure 1:
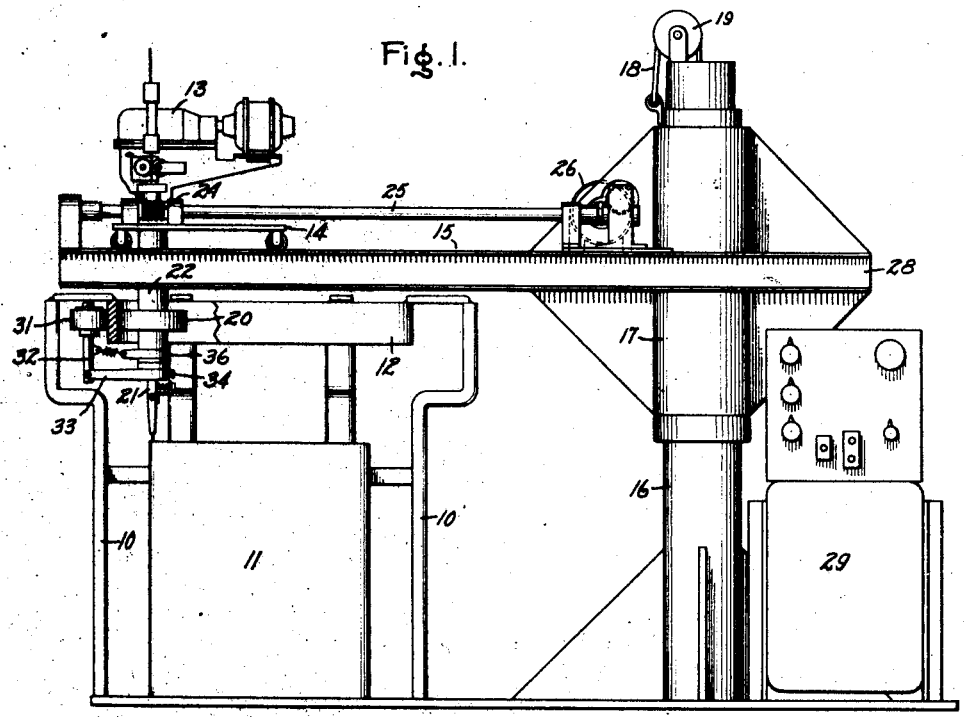
Figure 2:
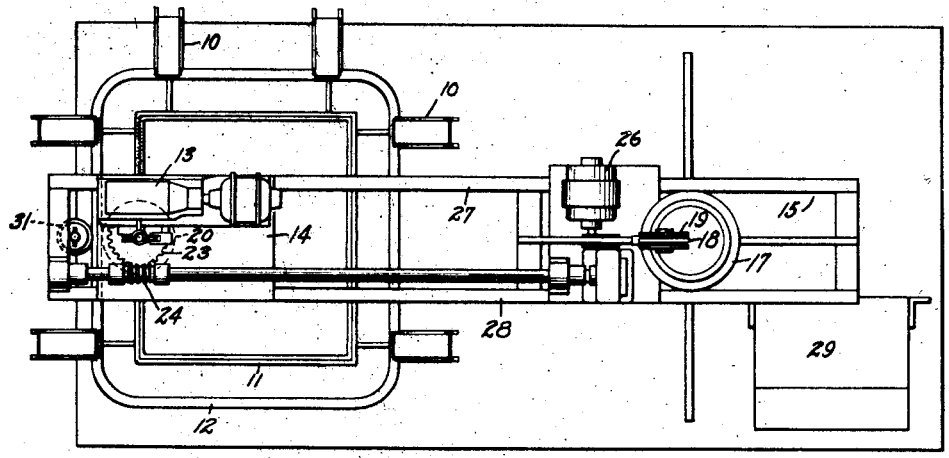

Further objects of my invention will become apparent from a consideration of the following description of an embodiment illustrated in the accompanying drawings, Figs. 1 and 2 of which show side and top views of an arc welding machine embodying my invention; Fig. 3 of which shows the relation of the nozzle and guiding means of the machine illustrated in Figs. 1 and 2, and Figs. 4 and 5 of which illustrate modifications of the guiding means of Figs. 1, 2 and 3 in which electromagnetic means are used in place of the mechanical means there illustrated.

The machine of Figs. 1 and 2 comprises a work holder 10 in which the work 11 is supported in fixed position relative to a guide track 12. In the arrangement illustrated, this guide track is supported on the work holder but this method of support is not necessary since other means may be provided for positioning it relatively to the work holder and the work located therein. The machine illustrated in Figs. 1 and 2 is an arc welding machine, and the welding tool constitutes an automatic arc welding head 13. This welding head is supported on a carriage 14 movable along a frame 15 which is pivotally and slidably supported on a vertically disposed pillar 16 by means of a bearing 17 attached to the frame and journaled on the pillar. By reason of its pivotal support the frame 15 may swing over the work in a horizontal plane and by reason of its sliding support it may be adjusted vertically to accommodate different kinds of work located in appropriate holders. The frame 15 is counter-balanced by a weight located within the pillar 16 and attached to the bearing 17 by a cable 18 which extends over a pulley 19 attached to the pillar 16. The pillar 16 and work support 10 are located on a common base which may or may not form an integral part of the machine.

The welding tool is guided along the seam by means of a wheel 20 through which the nozzle 21 of the welding head 13 extends. This wheel is journaled on the nozzle and connected by a hollow shaft 22 to a worm wheel 23. This worm wheel is driven by a worm 24 which is slidably mounted on a shaft 25 which extends along the frame 15. The inner end of this shaft is connected to a motor 26 by means of which rotation is imparted to it and through worm 24 and worm wheel 23 to the guide wheel 20. The carriage 14 is provided with flanged wheels which travel along the parallel disposed beams 27 and 28 of the frame 15. The to and fro movement of the carriage 14 on the frame 15 and the swinging of the frame 15 over the work in response to the guiding action of the wheel 20 on the guide track 12 enables the welding tool to follow any irregular configuration determined by the guide track 12 which has the same effective shape as the seam to be welded in the work 11. The control for the welding head and for motor 26 is indicated at 29.

The construction of the guiding means associated with the welding tool is illustrated in detail in Fig. 3 of the drawings. It will be noted that the hollow shaft 22 by means of which the worm wheel 23 is connected to the guide wheel 20 is journaled on a bearing 30 which is mounted on the nozzle 21. It will also be noted that the wheel 20 is held in engagement with the guide track 12 by another wheel 31 which is pivotally supported on an arm 32 by a collar 33 attached to nozzle 21 by a set screw 34. The wheels 20 and 31 engage the opposite sides of the guide track 12 and are held in engagement therewith through the biasing action of a spring 35 which is attached at one end to a collar 36 rotatably mounted on shaft 22 and at its other end to the arm 32 for the roller 31. The nozzle 21 is attached to the welding head 13 by means of a clamp 37' in which it is rotatably supported by a bearing 37. Inasmuch as the welding head 13 is supported on the carriage 14 the nozzle 21 is in effect supported on the carriage and held in fixed relation thereto but free to rotate about its own axis under the influence of wheel 31 which is attached thereto by arm 32 and collar 33. Arrangements such as illustrated in Fig. 3, by means of which the welding tool is directed along the seam by a guide wheel through which the tool extends and by means of which the welding tool is also rotated about its own axis through an agency which engages the guide track and holds the guide wheel in engagement therewith, are in accordance with the joint invention of myself and Robert M. Stephens whose application, Serial No. 690,060, for Welding apparatus, filed concurrently herewith is assigned to the same assignee as the present case. When supplying an electrode through a curved nozzle in order to direct it toward the work at a predetermined angle it is essential that the nozzle be rotated at those points where the direction of welding is changed so that the direction and angle at which the electrode is fed toward the work shall remain the same throughout the welding operation. The tip of the nozzle 38 is pivotally supported from the body of the nozzle 21 and may be swung laterally thereof by means of an adjusting screw 39 which engages an arm 40 attached to the nozzle tip. The arm 40 is biased against the head of the screw 39 by means of a spring 41.

It will be noted that the guide track in the apparatus above described is spaced outwardly from the seam to be welded a uniform distance equal to the radius of the guide wheel. The guide track is thus formed of sections which are parallel to the seam to be welded and which are connected at their ends by arcs tangent thereto and of the same curvature as the guide wheel. Consequently, at those points in the seam where the direction of welding is suddenly changed the guide wheel traveling along the inside surface of the track engages it along an extended surface which prevents slippage between the guide track and the guide wheel. It is of course within the contemplation of my invention to give to the guide track the same configuration as that on the seam to be welded but when this construction is employed the guide wheel will only make a line contact with its track and the advantages obtained by employing the preferred construction above noted are not then obtained.

Instead of employing mechanical means for holding the guide wheel in engagement with the guide track, magnetic or electromagnetic means may be employed for this purpose. Two arrangements in which electromagnetic means have been employed are illustrated in Figs. 4 and 5. In Fig. 4 the guide wheel 42 through which the nozzle of the welding tool extends is made of a magnetic material and engages a guide track 43 which is also made of magnetic material. The guide track 43 encloses a winding 44 by means of which it is magnetized to attract and hold in engagement therewith the guide wheel 42. In effect the guide track and wheel constitute a magnet and its armature. The arrangement of parts illustrated in Fig. 4 is otherwise the same as that described above in connection with claims 1, 2 and 3.

Instead of magnetizing the track as illustrated in Fig. 4, the guide wheel may be magnetized, and such an arrangement is shown in Fig. 5. In this figure the guide wheel 45 is provided with a magnetizing coil 46 which is electrically connected to slip rings 47 by means of which magnetizing current is supplied thereto. When magnetized, the wheel 45 is held in engagement with the guide track 48 which is made by some suitable magnetic material.

In the arrangements above described the welding tool has been illustrated as an automatic arc welding machine. It is, of course, to be understood that the welding tool is not necessarily an arc welding tool but may be a gas or other type of welding tool. In either case the welding tool acts as a support for the guide wheel through which it extends. In the arrangements illustrated the tool extends through the axis of rotation of the guide wheel, but this construction is not necessary since by disposing the tool radially from the center of rotation of the guide wheel a suitable oscillating motion may be imparted to the welding tool. The welding tool may be supported in any suitable manner for movement along the guide track, and my invention is not limited to the particular swinging frame arrangement illustrated and described above since other constructions may be employed for supporting the welding tool for movement along the guide track. Furthermore, although I prefer to mount the motive means for the guide wheel upon the swinging frame in order to decrease the size and weight of the travel carriage 14 on which the welding tool is supported, it will be understood that my invention is not limited to this particular arrangement for other arrangements may be employed without departing from my invention.

What I claim as new and desire to secure by Letters Patent of the United States, is:

1. Welding apparatus comprising a guide track, a welding tool, a wheel supported for rotation about said tool, means for supporting said tool for movement along said track, means for holding said wheel in engagement with said track, and means for rotating said wheel.

2. Welding apparatus comprising a welding tool, a wheel journaled on said tool, a guide track formed of sections parallel to the seam to be welded and connected at their ends by arcs tangent thereto and of the same curvature as said wheel, and means for holding said wheel in engagement with the inside surface of said track.

3. Welding apparatus comprising a guide wheel, a welding tool extending through said wheel at a point displaced radially from its center, a guide track spaced a uniform distance from the seam to be welded, and means for holding said guide wheel in engagement with said track.

4. Welding apparatus comprising a guide wheel, a welding tool extending through the center of said wheel, a guide track spaced outwardly from the seam to be welded a uniform distance equal to the radius of said wheel, and means for holding said wheel in engagement with the inside surface of said track.

5. Welding apparatus comprising a guide track and wheel one of which is a magnet and the other its armature, a welding tool extending through said wheel, means for supporting said tool for movement along said track, and means for rotating said wheel.

6. Welding apparatus comprising a guide track of magnetic material, a magnetic wheel operating thereon, a welding tool extending through said wheel, means for supporting said welding tool for movement along said track, and means for rotating said wheel.

7. Welding apparatus comprising a welding tool, a wheel journaled on said tool, a guide track, electro-magnetic means acting on said wheel and track for holding them in engagement with one another, means for supporting said welding tool for movement along said track, and means for rotating said wheel.

8. Welding apparatus comprising a work holder, a guide track, a frame pivoted for swinging movement over said work holder and said track, a carriage movable along said frame, a welding tool mounted on said carriage, a wheel journaled on said tool, means for holding said wheel in engagement with said guide track, and means for rotating said wheel.

9. Apparatus for arc welding seams of predetermined configuration comprising a work holder, a guide track of said predetermined configuration, a frame pivoted for swinging movement over said holder and said track, a carriage movable along said frame, a nozzle mounted on said carriage, a wheel journaled on said nozzle, means for holding said wheel in engagement with said track, means for feeding an electrode through said nozzle, and means for rotating said wheel.

10. Apparatus for welding seams of predetermined configuration comprising a work holder having a guide track of said predetermined configuration, a frame pivoted for swinging movement over said holder and said track, a carriage movable on said frame, a nozzle, means for supporting said nozzle on said carriage, a wheel supported for rotation about the longitudinal axis of said nozzle, means for holding said wheel in engagement with said track, and means supported on said frame for rotating said wheel.

11. Apparatus for welding seams of predetermined configuration comprising a work holder, a guide track of said predetermined configuration, a vertically disposed welding tool, a wheel journaled on said tool and operating on said track, a frame movable in horizontal directions over said work holder and said guide track, means for supporting said welding tool on said frame, means for holding said wheel against the side of said track, and means for rotating said wheel.

12. Apparatus for arc welding seams of a predetermined configuration comprising a work holder having a guide track of said predetermined configuration, a wheel operating on said track, a nozzle extending through said wheel, means for feeding an electrode through said nozzle, a frame pivoted for swinging movement over said work holder and said guide track, a carriage movable along said frame, means for supporting said nozzle on said carriage, and means for rotating said wheel.

13. Apparatus for welding seams of predetermined configuration comprising a work holder having a guide track of said predetermined configuration, a frame pivoted for swinging movement over said holder and said track, a carriage movable along said frame, a nozzle, means for supporting said nozzle on said carriage, a hollow shaft journaled on said nozzle and extending from said carriage to a position opposite said guide track, a wheel mounted on said shaft opposite said track, means for holding said wheel in engagement with said track, a second shaft extending along said frame, means supported on said frame for rotating said shaft, and means including a gear slidably mounted on said second shaft for rotating said first mentioned shaft and the wheel supported thereon.

14. Apparatus for welding seams of predetermined configuration comprising a work holder having a guide track of said predetermined configuration, a frame pivoted for swinging movement over said holder and said track, a carriage movable along said frame, a nozzle, means for supporting said nozzle on said carriage, a hollow shaft journaled on said nozzle and extending from said carriage to a position opposite said guide track, a wheel mounted on said shaft opposite said track, magnetic means acting on said wheel and said track for holding them in engagement with one another, a second shaft extending along said frame, means supported on said frame for rotating said shaft, and means including a gear slidably mounted on said second shaft for rotating said first mentioned shaft and the wheel supported thereon.

VERNI J. CHAPMAN.